United States Patent [19]

Gaffney et al.

[11] Patent Number: 5,107,042
[45] Date of Patent: Apr. 21, 1992

[54] PREPARATION OF OLEFINS USING SELECTIVELY PROTONATED ZEOLITE

[75] Inventors: Anne M. Gaffney; John A. Sofranko, both of West Chester, Pa.

[73] Assignee: Arco Chemical Technology, L.P., Wilmington, Del.

[21] Appl. No.: 759,260

[22] Filed: Sep. 13, 1991

Related U.S. Application Data

[63] Continuation-in-part of Ser. No. 375,214, Jul. 3, 1989.

[51] Int. Cl.$^5$ ............................................. C07C 4/02
[52] U.S. Cl. ................................... 585/651; 585/653; 208/120
[58] Field of Search ................. 585/651, 653; 208/120

[56] References Cited

U.S. PATENT DOCUMENTS

| | | | |
|---|---|---|---|
| 4,550,091 | 10/1985 | Sikkenga | 502/62 |
| 4,654,316 | 3/1987 | Barri et al. | 502/61 |
| 5,043,522 | 8/1991 | Leyshon et al. | 585/651 |

Primary Examiner—R. Bruce Breneman
Attorney, Agent, or Firm—William C. Long

[57] ABSTRACT

The invention relates to hydrocarbon conversion to lower olefins by reaction over a catalyst which is a zeolite having protonated sites external to the pores and exchangeable cation sites within the pores.

2 Claims, 2 Drawing Sheets

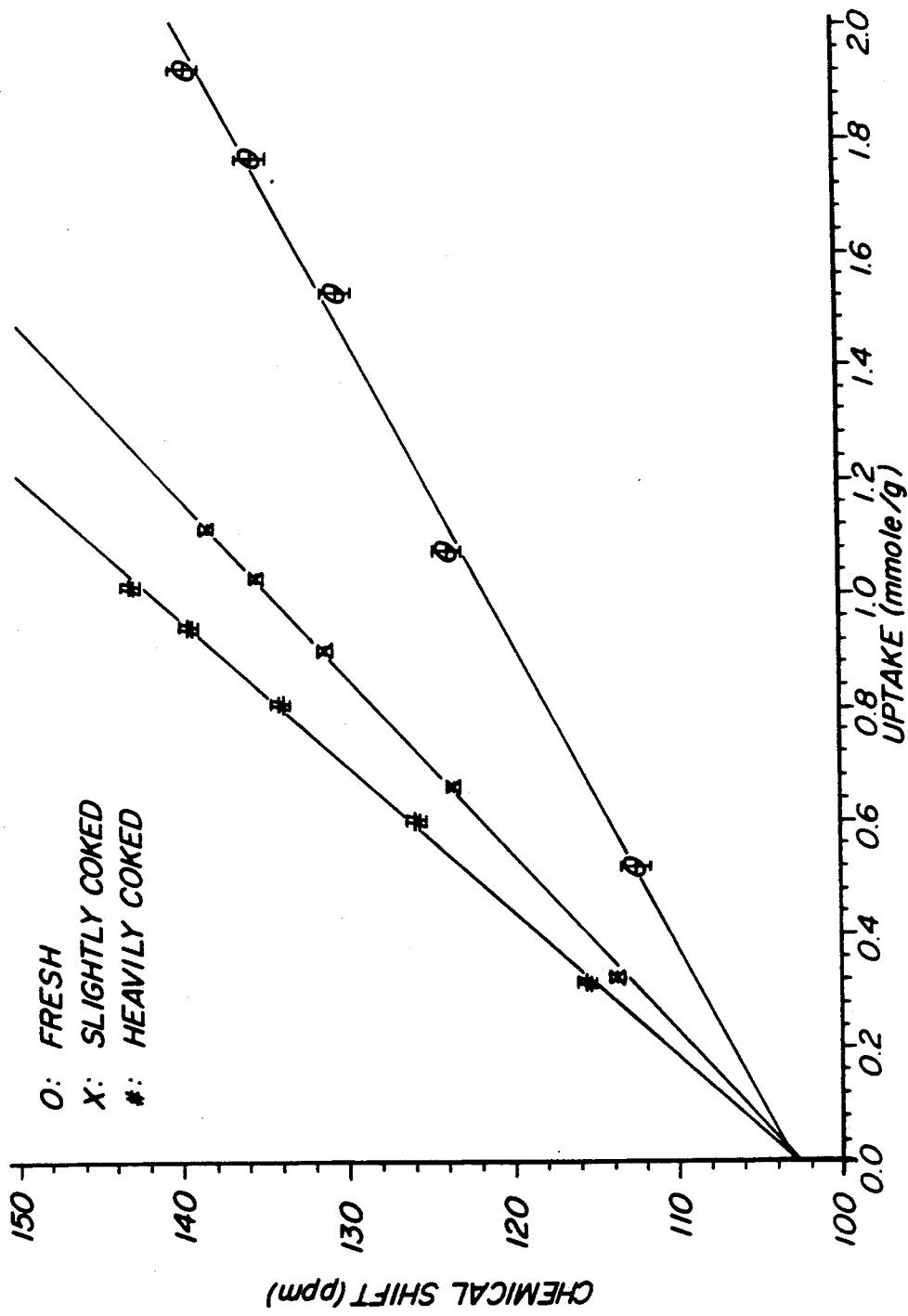

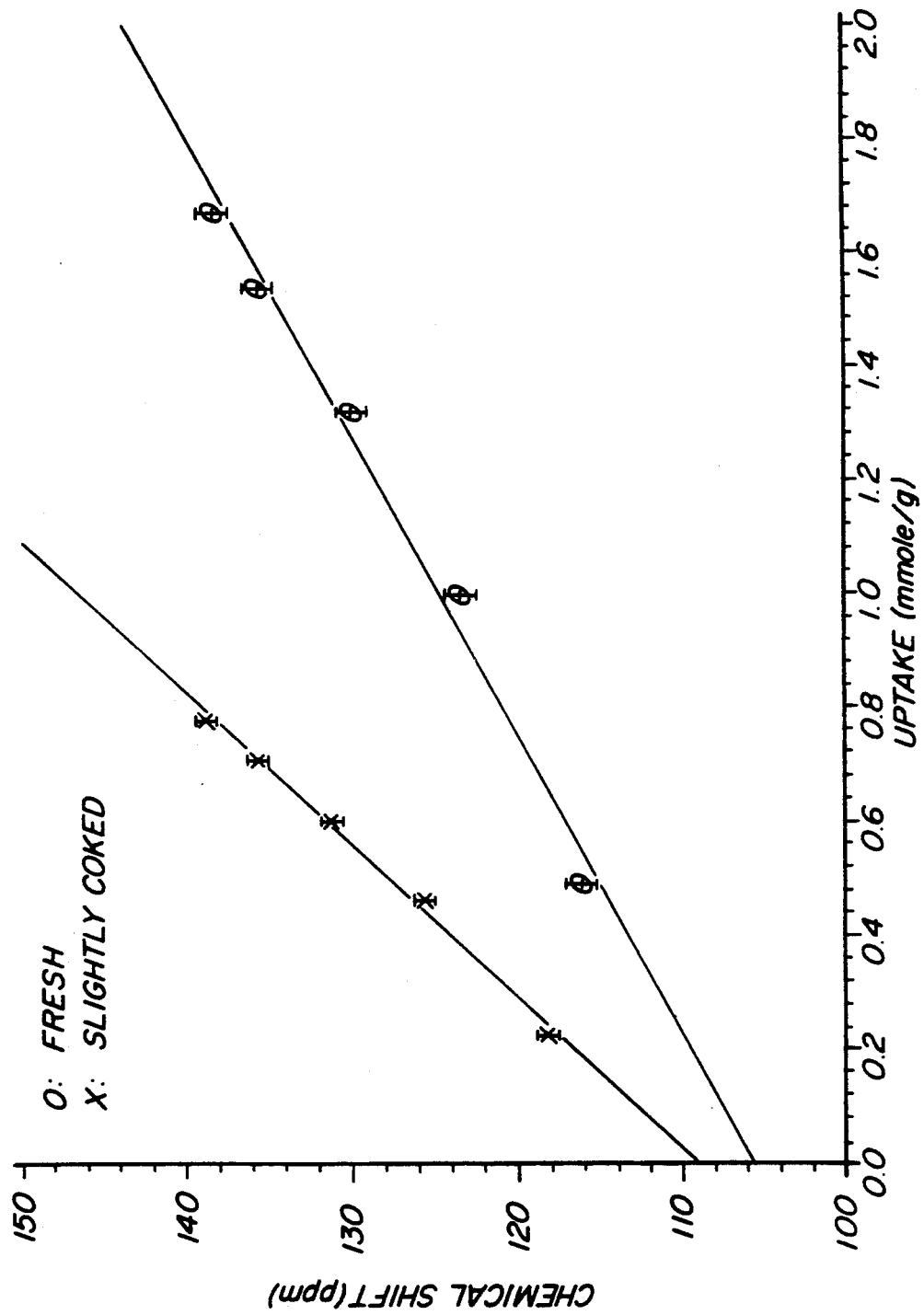

PREPARATION OF OLEFINS USING SELECTIVELY PROTONATED ZEOLITE

RELATED APPLICATIONS

This application is a continuation-in-part of copending application Serial No. 07/375 214 filed July 3, 1989.

BACKGROUND OF THE INVENTION

1. Field of the Invention

The present invention relates to a hydrocarbon conversion using as catalyst a zeolite such as ZSM-5 which has cationic sites within the zeolitic pores and which has protonic sites external to the zeolitic pores. The zeolite is formed, for example, by contacting a Na-ZSM with a sterically hindered protonated salt which does not substantially enter the zeolitic pores whereby only cation on the surface external to the pores is exchanged for the proton.

2. Description of the Prior Art

There are a great number of patents which relate to crystalline zeolites, their production and use.

Reference can be made, for example, to the following U.S. Patents which describe various zeolites: U.S. Pat. No. 3,702,886 which describes ZSM-5; U.S. Pat. No. 3,709,979 which describes ZSM-11; U.S. Pat. No. 3,832,449 which describes ZSM-12; U.S. Pat. No. 4,076,842 which describes ZSM-23; U.S. Pat. No. 4,016,245 which describes ZSM-35; and U.S. Pat. No. 4,046,859 which describes ZSM-38.

Generally speaking, the zeolites are prepared by crystallization and contain exchangeable cations, most notably sodium, distributed throughout Since zeolite catalytic activity is due largely to acidic sites throughout the crystal, customarily the exchangeable cations throughout the structure are replaced by protons. The method most commonly employed for this exchange is contact with ammonium chloride which is effective in exchanging protons for cations located both on zeolite surfaces which are external to the pores as well as within the pores of the crystalline zeolite.

There are, however, processes where acid sites and consequent catalytic activity within the zeolite pores is not advantageous. An example of such a process is the conversion of higher saturated and olefinic hydrocarbons to low molecular weight olefins as set forth in U.S. Pat. No. 5,043,522. Reactions occurring at acid sites within the pores promote the formation of carbon within these pores thus shortening the effective life of the zeolite.

For certain applications, a crystalline zeolite which has essentially only acid sites external to the pores offers distinct advantages. The present invention provides such a zeolite and its preparation.

BRIEF DESCRIPTION OF THE INVENTION

In accordance with this invention, a zeolite, which has been prepared by conventional methods such as shown in the U.S. Patents cited above and which has exchangeable cation such as sodium located at sites both within and external to the zeolite pores, is contacted with a sterically hindered protonated salt whereby the cations external to the pores are exchanged for protons while those cations located within the pores remain. Hydrocarbon conversion is accomplished using this catalyst.

DESCRIPTION OF THE DRAWINGS

The attached drawings show graphically the results of Xenon NMR tests on a standard H-ZSM-5 (FIG. 1) and on a comparable catalyst of the invention (FIG. 2).

DETAILED DESCRIPTION

In accordance with the invention, a crystalline zeolite having exchangeable cation such as $Na^+$ at sites within the pore structure as well as external to the pores is formed by known procedures. The zeolite is contacted with a protonated sterically hindered salt in order to protonate essentially only the sites which are external of the zeolite pores.

Suitable sterically hindered salts are those wherein the static adsorption of the unprotonated species on the zeolite is less than 0.010 $\mu m^3/g$. See R. Szostak, "Molecular Sieves, Principles of Synthesis and Indentification", Burtron Davis, ed., Van Nostrand Reinhold Catalysis Series (1989), 306–312, and E. L. Wer, G. R. Landolt, A. W. Chester, "New Developments in Zeolite Science and Technology", Murakami, Iijima, Wards, eds, Elsevier, Amsterdam (1986); 547.

Especially preferred salts are those having the formula

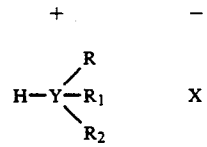

wherein Y is a Group 5a element, preferably N, P, As, Sb, Bi, and the like, X is halide, preferably Cl, and R, $R_1$ and $R_2$ are alkyl groups, preferably having 3 or more carbon atoms or aryl groups.

Novel zeolites of different pore opening sizes can be prepared according to the invention. It is essential only that the sterically hindered protonated salt which is used to protonate sites external to the pores has a static adsorption of the unprotonated species less than 0.010 $\mu m^3/g$.

In the case of treatment of Na-ZSM-5, (n-butyl)$_3$ N.HCl is a satisfactory salt. Other salts include (n-pentyl)$_3$ N.HCl, (i-butyl)$_3$ N HCl, (n-butyl)$_2$ (ethyl) N.HCl and the like.

With larger pore zeolites, larger effective size protonated salts are used. With Na-ZSM-12, for example, illustrative protonated salts are (neopentyl)$_3$ N.HCl, (cyclohexyl)$_3$ N.HCl, and the like.

The suitability of a particular salt for treatment of a particular zeolite is readily determined by measuring the static adsorption of the unprotonated species by standard test methods.

As a result of contact with these protonated salts exchangeable cations in the zeolite external to the pores are exchanged and replaced with protons and there is produced the zeolite used in this invention.

Because only cations external to the zeolite pores are exchanged, the zeolite pores exhibit little or no catalytic activity since such activity is a direct function of acidity. Thus, the zeolite is a material wherein the catalytic activity is provided by the surfaces external to the pores and has wide utility in systems where diffusion into and reaction within the pores is not essential or desirable.

The zeolites used in the invention are quite different when compared with materials made by conventional procedures. Comparing zeolites of the invention with materials prepared in the same fashion except that conventional protonation with, for example, ammonium chloride is employed demonstrates the significant differences. Cation levels, e.g., $Na^+$, are much higher in the zeolites of the invention. The constraint index likewise is remarkably different, being much lower than similar materials which have been substantially completely protonated. This illustrates the essential inactivity of surfaces within the zeolite pores by reason of the fact that sites therein are non-acidic.

In the preparation of the zeolites of the invention, the conventional preparation procedures described for example in U.S. Pat. Nos. 3,702,886, 3,709,979, 3,832,449, 4,076,842, 4,016,245, 4,046,859 and the like, and which result in the formation of a crystalline zeolite with exchangeable cation such as $Na^+$ on surfaces within and external to the zeolite pores, can be employed The disclosures of said Patents are incorporated herein by reference.

Treatment with the sterically hindered protonated salt is preferably carried out in a manner similar to that which has been employed previously to accomplish complete protonation of the zeolite. An aqueous solution of the sterically hindered protonated salt is contacted, preferably at mildly elevated temperature, e.g. 50°–150° C., with the cation containing zeolite for a substantial time, e.g. 10 minutes to 5 hours. Preferably, the contact is repeated with fresh sterically hindered salt solution several times to complete exchange of the cations for protons on surfaces external to the pores.

After treatment, the zeolite is preferably dried and calcined prior to use in the hydrocarbon conversion. It has been found that $C_4$ and higher olefin and paraffin hydrocarbons can be converted to lower $C_2$–$C_4$ olefins by contact with the zeolite, prepared as above described, at reactive conditions. Individual or mixed hydrocarbons can be used. The zeolite catalyst is especially useful for the production of lower olefins from a mixture of saturated and unsaturated hydrocarbons by procedures described in U.S. Pat. No. 5,043,522. As described in said patent, a mixture of saturated and unsaturated hydrocarbons comprised of 40% to 95% saturated hydrocarbons are contacted with the catalyst at conditions effective to form propylene. In preferred practice, light olefins are separated from the reaction mixture, and unreacted saturated feed and product olefin other than the desired light olefins product are recycled for further reactive contact over the zeolite catalyst.

Saturated hydrocarbons employed as feed are paraffins having at least four carbon atoms and are preferably $C_5$ to $C_{20}$ paraffins. The feed mixture to the conversion zone contains between 40 and 95 wt. % of these paraffins based on the total of paraffins and olefins.

Combined with the paraffins in the conversion feed mixture are $C_4$ to $C_{20}$ olefins in amount of 5 to 60 wt. % based on the total of paraffins and olefins, preferably 10 to 50 wt. % olefins.

The feed mixture may also contain aromatics, naphthenes and inerts such as nitrogen, but the benzene content should not exceed 30 wt. % of the total feed. At benzene concentrations above 40 wt. %, alkylation becomes significant and light olefin yields are reduced. The feed mixture may also contain steam in amount up to 30 mol. %, preferably 1 to 20 mol. %.

Low hydrocarbon partial pressures and low conversions per pass favor propylene production. The feed hydrocarbon can be admixed with steam or inert gas such as nitrogen. The hydrocarbon partial pressure is as low as practical, illustratively 1 to 30 psia. Where no diluents are employed, system pressures ranging from about −12 to 50 psig, preferably −5 to 30 psig are suitable Higher pressures can be used when diluents are employed High space velocity and short residence times are preferred in order to maintain the desired low conversions per pass. Paraffin hydrocarbon conversions per pass are preferably less than 50%. Space velocities depend on the particular zeolite used and are 1 to 5000 preferably 5° to 200° $hr^{-1}$ WHSV. Reactor residence times are 0.001 to 20 seconds, preferably 0.01 to 5 seconds.

The conversion reaction of the instant invention is highly endothermic. Preferably fluidized solid catalyst conversion procedures are used with the feed hydrocarbon vapor contacting fluidized particles of the zeolite catalyst. Heat necessary to maintain the reaction is provided by separately heating the catalyst particles in a fluidized regeneration zone as by combustion of appropriate fuel hydrocarbon.

Fixed bed procedures can be employed In such cases, the use of reaction zones in series with interstage heating is advantageous.

EXAMPLE 1

A solution, Solution A, was prepared by mixing 200 grams $NaSiO_2$ with 150 ml of water. A second solution, Solution B, was prepared by mixing 75 grams NaCl, 6.70 grams $Al_2(SO_4)_3.16\ H_2O$, 19.60 grams $H_2SO_4$ and 340 ml $H_2O$. A third solution, Solution C, was prepared by mixing 25 grams tetrapropylammonium bromide with 100 ml $H_2O$.

Solution A and Solution B were combined and mixed for 5 minutes. Solution C was added to the mixture and the resulting mixture of Solution A, Solution B and Solution C was mixed for 50 minutes.

A 300 ml autoclave was charged with 175 ml of the mixture of the three solutions. The mixture was stirred in the autoclave and heated (149° C.) for 16 hours. After cooling, the product was removed from the autoclave and filtered to separate water. The zeolite crystals thus obtained were washed with water to remove residual chlorine. The resulting Na-ZSM-5 was dried at 110° C. and then calcined at 550° C. for 16 hours to remove the template.

To about 10 grams of the Na-ZSM-5 was added 500 ml of a 1 molar aqueous solution of $(n\text{-butyl})_3$ N.HCl and the resulting heterogeneous mixture was heated to 80° C. and stirred for 2 hours. The solution was filtered and the ZSM-5 was contacted with a fresh 500 ml of solution, heated, stirred and filtered as above described. This procedure was repeated for a total of 5 times. The recovered solids comprising the novel zeolite of the invention were dried at 110° C. and calcined at 550° C. for 16 hours.

Elemental analysis of the novel zeolite showed that it contained 0.32 wt % sodium as compared to 4.3 wt % sodium for Na-ZSM-5 and <0.02 wt % sodium for H-ZSM-5. The Constraint Index for the novel zeolite as determined by the procedure given in U.S. Pat. No. 4,227,992 was 1.5; this can be compared with a Constraint Index for H-ZSM-5 which is normally about 10.8 at the same conditions.

The catalytic effect of the novel zeolite on the conversion of butene at 550° C., 25 WHSV and 16000

GHSV was determined and is compared with that of H-ZSM-5 in the following table:

TABLE 1

| Zeolite | % $C_4=$ Conversion | % Selectivity | | | | | |
|---|---|---|---|---|---|---|---|
| | | $C_3=$ | $C_2=$ | $C_{1-3}$ | $C_4$ | $C_{>5}$ | Coke |
| H-ZSM-5 | 60.2 | 48.9 | 6.2 | 1.6 | 6.5 | 36.8 | 0.04 |
| Novel ZSM-5 | 70.2 | 45.7 | 8.6 | 3.7 | 9.7 | 32.2 | 0.03 |

EXAMPLE 2

The novel ZSM-5 prepared as described in Example 1 was used in the conversion of n-octane to lower olefins. Specifically, a mixture of 3 wt. % of the zeolite, 60–100 mesh was admixed with T-64 $Al_2O_3$ of the same mesh size and the admixture was charged to a quartz reactor. N-octane, 300 WHSV $hr^{-1}$, was passed through the zeolite-alumina mixture at the indicated temperature for 2 hours followed by 2 hour air regeneration. Nitrogen purge was used between reaction and regeneration. The following able shows the results obtained:

TABLE 2

| | Temp, °C. | | | | | |
|---|---|---|---|---|---|---|
| | 550 | | 600 | | 650 | |
| | ZSM-5 | Novel ZSM-5 | ZSM-5 | Novel ZSM-5 | ZSM-5 | Novel ZSM-5 |
| % Conversion | 53.2 | 52.5 | 72.9 | 74.56 | 87.3 | 86.35 |
| | % Selectivity | | | | | |
| $CH_4$ | 0.80 | 0.65 | 1.57 | 1.08 | 0.37 | 2.62 |
| $C_2=$ | 7.67 | 7.88 | 11.07 | 11.64 | 17.85 | 15.57 |
| $C_2$ | 3.35 | 3.17 | 4.89 | 4.37 | 5.85 | 5.48 |
| $C_3=$ | 22.31 | 24.14 | 25.95 | 27.75 | 30.95 | 29.74 |
| $C_3$ | 8.80 | 10.88 | 9.44 | 9.46 | 5.83 | 6.47 |
| $i-C_4$ | 0.97 | 1.16 | 1.15 | 0.84 | 1.08 | 0.78 |
| BD | 0.03 | 0.03 | 0.08 | 0.07 | 0.25 | 0.23 |
| $n-C_4$ | 4.49 | 5.79 | 5.99 | 6.16 | 4.53 | 5.00 |
| $C_4=$ | 22.65 | 25.29 | 18.37 | 20.30 | 15.78 | 17.82 |
| $C_5=$ | 7.07 | 8.50 | 6.22 | 5.38 | 2.68 | 3.93 |
| $C_5$ | 6.45 | 6.89 | 7.84 | 5.51 | 2.77 | 3.90 |
| $C_6$ | 3.29 | 3.73 | 2.49 | 3.64 | 1.49 | 3.46 |
| $C_7$ | 5.53 | 0.74 | 1.21 | 0.46 | 2.92 | 0.76 |
| $C_8=$ | 4.21 | 0.06 | 2.18 | 2.23 | 6.13 | 2.64 |
| $C_9$ | 2.30 | 1.08 | 1.55 | 1.01 | 1.49 | 1.13 |
| $C_{10}$ | 0.01 | 0 | 0 | 0.06 | 0.01 | 0.03 |
| Coke | 0 | 0 | 0.1 | 0 | 0.05 | 0 |
| $C_3=/C_3$ | 2.5 | 2.2 | 2.7 | 2.9 | 5.3 | 4.6 |
| $C_3=/C_2=$ | 2.9 | 3.1 | 2.3 | 2.4 | 1.7 | 1.9 |

EXAMPLE 3

The novel zeolite prepared as described in Example 1 was used in short cycle conversion of butene-2. Temperature was 550° C., GHSV was 16000 $hr^{-1}$, WHSV was 25 $hr^{-1}$. Butene-2 was passed through the zeolite bed for 30 seconds, followed by 10 min. air regeneration Nitrogen purge was used between reaction and regeneration The following table shows the results obtained.

TABLE 3

| | Novel ZSM-5 | ZSM-5 |
|---|---|---|
| % Conversion | 64.7 | 68.9 |
| | % Selectivity | |
| $CH_4$ | 0.10 | 0.09 |
| $C_2$ | 0.08 | 0.11 |
| $C_2=$ | 8.0 | 7.9 |
| $C_3$ | 2.2 | 2.5 |
| $C_3=$ | 49.7 | 45.8 |
| $i-C_4$ | 2.7 | 3.0 |
| $n-C_4$ | 4.8 | 4.0 |
| BD | 0.2 | 0.20 |

TABLE 3-continued

| | Novel ZSM-5 | ZSM-5 |
|---|---|---|
| $C_5$ | 21.3 | 18.8 |
| $C_6$ | 10.6 | 17.1 |
| Coke | 0.5 | 0.6 |
| $C_3=/C_3$ | 22.6 | 18.3 |
| $C_2=/C_2$ | 100 | 71.8 |
| $C_3=/C_2=$ | 6.2 | 5.8 |

Both the novel zeolite described in Example 1 and a comparable H-ZSM-5 were analyzed by Xenon NMR. Results obtained are depicted graphically in FIG. 1 for the H-ZSM-5 and in FIG. 2 for the novel zeolite.

Xenon NMR analysis involves degassing a known quantity of zeolite sample to a pressure of $10^{-5}$ torr followed by Xenon uptake to 40–500 torr. The sample is analyzed on a Bruker WM 250 NMR spectrometer and the Xenon chemical shift as compared with a literature standard is determined as is the Xenon uptake at a series of pressures. This method of analysis is described in the literature. See, for example, J. Demarquay and J. Fraissard, Chem. Phys. Lett., 136 (1987) 314.

The results obtained and shown in the Figures clearly illustrate the important differences between the conventional zeolite and that of the invention.

For example, the Y-axis intercept of the conventional material is the same (approximately 103 ppm) for fresh as well as lightly and heavily coked material. This shows that the pore diameter had not changed and is indicative of coking within the zeolite channels at acid sites therein.

By way of contrast, the novel zeolite of the invention had a higher intercept (approximately 106 ppm) in the fresh condition and a significantly higher intercept when slightly coked. The higher intercept of the fresh catalyst compared to the conventionally fresh catalyst demonstrates narrowing of the pores of the novel catalyst due to the cation present at sites within the pores. The higher intercept of the lightly coked novel zeolite compared to fresh samples of the same catalyst is evidence that the coking takes place on surfaces external to the pores which results in partial blockage of the pore openings.

The data show the important differences between the zeolite of the invention wherein only surfaces external to the pores are protonated leaving cationic sites within the pores, and the conventional zeolite which has acidic protonated sites both within and external to the pores.

What is claimed is:

1. The method of preparing olefins from a hydrocarbon feedstock which comprises:
   a) feeding a hydrocarbon having 4 or more carbon atoms to a reaction zone containing a zeolite catalyst selected from the group consisting of ZSM-5 and ZSM-12 characterized by protonated sites essentially only external to the pores and by exchangeable Na+ cation containing sites essentially only within the pores,
   b) contacting said hydrocarbon with said catalyst at reaction conditions favoring conversion of said hydrocarbon to propylene, and
   c) separating product $C_2$–$C_3$ olefins from the reaction mixture.

2. The method of preparing olefins from hydrocarbon feedstock which comprises:
   a) feeding a mixed stream of saturated hydrocarbons having 4 or more carbon atoms and olefins having 4 or more carbon atoms to a reaction zone containing a zeolite catalyst selected from the group consisting of ZSM-5 and ZSM-12 characterized by protonated sites essentially only external to the pores and by exchangeable Na+ cation containing sites essentially only within the pores, b) contacting said mixed stream with said catalyst at reaction conditions favoring conversion of said mixed stream to propylene, and c) separating product $C_2$–$C_3$ olefins from the reaction mixture.

* * * * *